Sept. 7, 1965 D. L. GUNN ETAL 3,205,455

TRANSISTOR PHASE MODULATOR

Filed Dec. 11, 1961

INVENTOR.
DAVID L. GUNN
RICHARD D. CARSELLO
BY Mueller & Aichele
ATTYS.

United States Patent Office 3,205,455

Patented Sept. 7, 1965

3,205,455

TRANSISTOR PHASE MODULATOR

David L. Gunn, Lombard, and Richard D. Carsello, Chicago, Ill., assignors to Motorola, Inc., Chicago, Ill., a corporation of Illinois Filed Dec. 11, 1961, Ser. No. 158,513
5 Claims. (Cl. 332—18)

This invention relates in general to radio apparatus and in particular to a radio transmitter having a transistorized phase modulator with improved operating characteristics.

It is desirable that radio apparatus be fully transistorized in many applications for maximum reliability, reduced size and weight, and to take full advantage of the relatively small operating power requirements of transistors. This is particularly true of devices designed to be carried on the person and operated from a self-contained battery power source. Miniaturized radio receiving devices of the above type are in common use, but the problem of providing satisfactory transmitting devices has been considerably more difficult.

Phase modulators of various types have been employed in previous radio transmitter units utilizing vacuum tubes. A common characteristic of such phase modulators is the requirement that the output must couple into a relatively high impedance multiplier or buffer stage, such as the control grid of the associated vacuum tube. With terminal impedances at relatively high values, the result is that impedance matching is not a serious problem and that vacuum tube interelectrode capacitance may be disregarded from a practical standpoint.

A problem is encountered, however, in providing a transistorized phase modulator since transistor terminal impedances are of comparatively low values. In addition, an inherent input impedance is exhibited by transistors of a substantially capacitive nature which varies with signal level, the effects of which must necessarily be taken into consideration if the desired operating characteristics are to be realized.

It is therefore an object of the present invention to provide a radio transmitter having a transistorized phase modulator with improved distortion and linearity characteristics.

Another object is to provide a radio transmitter with a transistorized phase modulator circuit where the capacitive effect of transistor input impedance is effectively nullified.

Still another object of the invention is to provide a miniature radio transmitter device with a transistorized phase modulator having its output properly matched in impedance to the input of a succeeding transistorized frequency multiplier stage.

A feature of the present invention is the provision of a radio transmitter having a phase modulator circuit including a transistor having a first input electrode for receiving radio frequency signals and a second input electrode for receiving the modulating signal, with the phase modulator circuit operating to shift the phase of the radio frequency signals according to the instantaneous amplitude of the radio modulating signal which controls the transconductance of the transistor.

Another feature is the provision of such a phase modulator circuit including an associated transistor wherein a variable inductance is connected in the output circuit between the collector electrode and a reference potential to effectively nullify the capacitive effect in the exhibited transistor input impedance for increasing the phase deviation capability and to provide optimum impedance matching between the output of the phase modulator and the input to a succeeding frequency multiplier stage, thereby minimizing distortion and maximizing linearity of deviation.

Still another feature is the provision of such a phase modulating circuit including an associated transistor having input and output circuits which may be coupled to relatively low terminal impedances and wherein such transistor includes a transconductance characteristic approximating the angular deviation characteristic of the phase modulator circuit to further minimize distortion.

The invention is illustrated in the accompanying drawings in which.

In practicing the invention, a miniaturized radio transmitter device is provided as a self-contained unit, including a plurality of transistorized stages, built-in microphone and antenna assembly, and battery power source, all contained within an associated housing. A phase modulator circuit is further provided including a transistor with a base electrode coupled to a source of oscillator signals of relatively high frequency and of substantially constant amplitude and phase, and an emitter electrode coupled to a source of audio modulating signal voltages. The transconductance of the transistor is varied according to the applied modulation voltages to effect the desired phase modulation of the high frequency signal energy. The transistor is selected with a transconductance characteristic which closely approximates the angular deviation characteristic of the phase modulation circuit, thereby providing essentially linear operation over the entire range of audio modulation frequencies. Further, a variable inductance is connected across the output of the transistor having a selected value to effectively nullify the capacitive effect in the inherent input impedance exhibited by the transistor, thereby increasing the maximum phase shift capability of the phase modulation circuit and to provide optimum impedance matching to the succeeding frequency multiplier stage. The result is a phase modulator circuit with improved distortion and linearity characteristics and designed for compatible operation in transistorized circuitry where terminal impedances are of comparatively low values.

Figure 1:
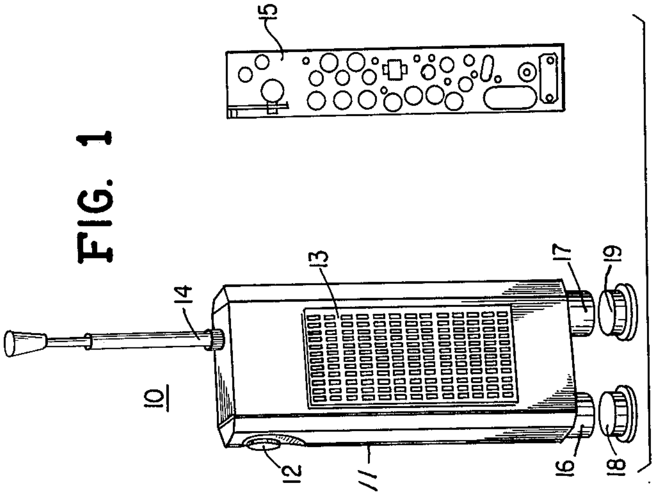
FIG. 1 is a perspective view of the miniaturized radio transmitter device embodying the present invention.

Referring to the drawings, a perspective view of the pocket radio transmitter 10 is shown in FIG. 1. The transmitted stages and associated electronic circuitry, mounted on a printed circuit chassis 15, are received in plastic housing 11 and operated by a push-to-talk switch 12 included on one side of the housing. Operating power is provided by batteries 16 and 17 insertable through provided apertures in the bottom of housing 11. Batteries 16 and 17 are secured within the housing by battery cap covers 18 and 19, adapted to be rotatably received within the housing apertures. A talk-through-grill 13 is integrated in the front panel and a telescopic antenna assembly 14 is extendable from the top of the housing. Transmitter 10 is of a size to be conveniently held in one hand with the thumb operating the push-to-talk switch 12 while the operator speaks into grill 13.

Figure 2:
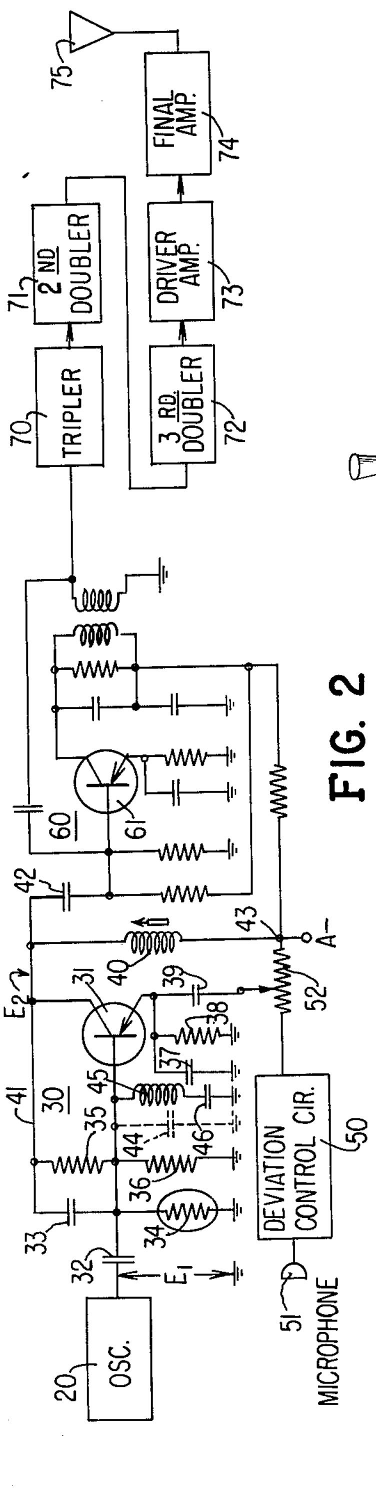
FIG. 2 is a partial block and schematic diagram of the transmitter electrical circuitry.

FIG. 2 is a block and schematic diagram of the electronic circuitry of transmitter 10. In operation, the output of a crystal-controlled oscillator 20 is applied to a phase modulating circuit 30. The output of oscillator 20 is a continuous signal wave of substantially constant amplitude and phase and may be on the order of 5 to 7 megacycles. Signals from the output of a deviation control circuit 50 are also applied to phase modulator 30. Deviation control circuit 50 is operative to limit the amplitude variations of the audio modulating signals received from microphone 51 to a predetermined value as determined by the setting of control potentiometer 52. Circuit 50 operates in a well known manner, having provisions for differentiating, amplifying and clipping audio signals from microphone 51 above the predetermined level of amplitude with an included integration network for shaping the clipped square wave into triangular shaped wave. Circuit 50 functions as an instantaneous deviation limiting circuit of the type as disclosed in patent No. 2,759,052, issued to A. A. MacDonald et al. on August 14, 1956, and assigned to the assignee of the present invention. The overall effect is to limit the amplitude and control the slope of the audio signals from microphone 51 which can pass to phase modulator circuit 30.

Phase modulator circuit 30 serves to shift the phase of the high frequency signal wave received from oscillator 20 according to the instantaneous amplitude variation of the audio modulation signal voltages applied between the base emitter electrodes from deviation control circuit 50. The transconductance characteristic of associated transistor 31 is therefore controlled by the applied audio modulation. A more detailed analysis of phase modulator circuit 30 will be considered subsequently.

The output of phase modulator circuit 30 is coupled to stage 60 which operates as a conventional frequency doubler. The signal is successively applied to stages 70, 71 and 72 where the frequency of the signal is respectively tripled in frequency, doubled in frequency, and again doubled in frequency. Stages 60, 70, 71 and 72 are similar in operation, multiplying the input frequency and increasing the deviation to the proper levels. The signal from phase modulator 30 is therefore multiplied twenty-four times to produce the final frequency of the carrier signal.

The correctly multiplied carrier signal is applied to driver-amplifier stage 73 which amplifies the signal to the proper level to drive final amplifier stage 74. Final amplifier stage 74 provides a nominal one-half watt to antenna 75 for transmission as radiant energy.

Returning to the specific operation of phase modulator circuit 30, transistor 31 has base, emitter and collector electrodes. Operating potential (A—) is supplied to the collector electrode from terminal 43 through coil 40. Resistors 34, 35 and 36 form a conventional voltage divider network to provide proper bias voltage to the base electrode. Resistor 35 is connected between lead 41, at A— potential, and the base electrode. Resistors 34 and 36 are connected in parallel between the base electrode and ground. Resistor 34 is of the temperature-sensitive type to provide stabilization of transistor 31 over a desired ambient temperature range. Capacitors 32 and 33, of equal capacitance, are connected in series between the output of oscillator 20 and the collector electrode of transistor 31, with the junction of capacitors 32 and 33 being connected to the base electrode. Resistor 38 is the emitter load resistor with capacitor 37 providing the necessary bypass. A radio frequency choke 45 and an audio bypass capacitor 46 are connected in series between the base electrode and ground.

Radio frequency signals from oscillator 20 are applied to the input of the modulator at capacitor 32. Audio signals are applied between the base emitter electrodes through coupling capacitor 39. If the input voltage to the phase modulator circuit 30 is held substantially constant in amplitude and phase, the operation thereof may be expressed as:

$$(1) \qquad E_2=E_1\times\frac{1-jXG}{1+jXG}$$

where $E_2$ is the output voltage appearing between the collector electrode and ground, $E_1$ is the input voltage applied to the modulator, X is the impedance value presented by capacitor 32 or 33 and G is the transconductance of transistor 31. The audio signal voltages impressed between the base emitted electrodes vary the transconductance of the transistor according to the instantaneous amplitude thereof.

The angular deviation characteristic of phase modulator uircuit 30 expressed in Equation 1 may be alternately expressed as:

$$(2) \qquad E_2=E_1\times\epsilon^{\phi}$$

where the angle $\phi$ is the instantaneous angular deviation and is equal to $-2\tan^{-1}/XG/$. This indicates that, with $E_1$ remaining constant in amplitude, a phase shift in $E_2$ will result which is twice the angle whose tangent is the absolute value of XG. Thus, if the transconductance of transistor 31 is varied between 0 and infinity, it can readily be seen that the phase of $E_2$ will change from being equal to $E_1$ to approximately 180° out of phase with $E_1$.

Figure 3:
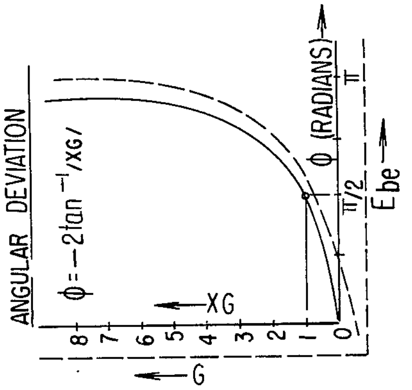
FIG. 3 is a graphic representation of the angular deviation characteristic of the phase modulator and the transconductance characteristic of the associated transistor.

The angular deviation characteristic is represented graphically by the solid line in FIG. 3 with (angle) $\phi$ being plotted against the product of XG. The point around which phase modulation takes place is set at $XG=1$, or $\pi/2$ radians (90 degrees). Varying the transconductance of transistor 31 between 0 and infinity will therefore effect a phase shift in $E_1$ between 0 and 180 degrees.

For optimum distortion, it is understood that the transconductance versus bias characteristic of transistor 31 should be identical to that of the angular deviation characteristic to provide linear operation over the deviation range. The dotted line in FIG. 3 represents the transconductance characteristic of transistor 31 obtained by plotting the transconductance (G) over a given range of bias voltage values ($E_{be}$). As may be seen, transistor 31 has been selected to provide a transconductance characteristic which closely approximates the angular deviation characteristic of phase modulator circuit 30, thereby providing essentially the desired linearity of operation.

In the foregoing, the inherent input impedance exhibited by transistor 31 between base and emitter electrodes has not been taken into consideration. In vacuum tubes, interelectrode capacity as may be present between grid and cathode is usually of a value low enough, in most cases, to be disregarded from a practical standpoint. Further, in tube type phase modulators, input and output impedances are very high such that upon coupling to circuitry with corresponding high impedance values, circuit interaction is minimized. In transistorized circuitry, however, terminal impedances are of a relatively low value as well as the aforementioned inherent input impedance of the associated transistor being of a substantially capacitive nature and of an appreciable value. Since the phase shift provided through transistor 31 in phase modulation circuit 30 is dependent upon the relation of the transconductance of the transistor to the impedance of capacitors 32 and 33, the effect of such added capacitive effect inherent in transistor input impedance is to reduce the maximum phase shift capability. Less phase shift capability means a higher attendant distortion characteristic and requires additional multiplication of frequency to obtain the required deviation of the transmitted wave.

To compensate, a variable inductance 40 is included in the output circuitry of transistor 31 in phase modulator circuit 30. Inductance 40 is selected so as to effectively nullify the capacitive effect in the transistor input impedance (identified as numeral 44) and therefore results in an increase in phase shift capability for phase modulation circuit 30. In addition, inductance 40 provides proper impedance matching between the collector electrode of transistor 31 and the input base electrode of transistor 61 in first doubler stage 60 as well as further optimizing the transistor transconductance verses bias characteristic. Inductance 40 therefore insures minimum distortion, maximum linear deviation, and proper impedance matching.

In the disclosed embodiment of the invention it has been found that components of the following type and values provide satisfactory results:

| | |
|---|---|
| Transistor 31 | Type 2N384. |
| Capacitor 32 | 150 micromicrofarads. |
| Capacitor 33 | 150 micromicrofarads. |
| Thermistor 34 | 10,000 ohms (cold). |
| Resistor 35 | 100,000 ohms. |
| Resistor 36 | 4,700 ohms. |
| Capacitor 37 | .01 microfarads. |
| Resistor 38 | 1,000 ohms. |
| Capacitor 39 | 1 microfarad. |
| Inductor 40 | 14 microhenries (variable). |
| Inductor 45 | 50 microhenries. |
| Capacitor 46 | 4 microfarads. |

The invention therefore provides a phase modulator circuit which is particularly suitable for transistorized circuitry where terminal impedances are of relatively low values. The phase modulator circuit is simple in design, yet reliable in operation and exhibits desired operating characteristics with respect to distortion and linearity.

We claim:

1. In a phase modulation signaling system, a phase modulation circuit having a first input terminal to which constant phase carrier signal waves may be applied, a second input terminal to which audio modulation signal voltages may be applied, and an output terminal for providing phase modulated carrier wave signals, a transistor with base, emitter and collector electrodes and having a given transconductance characteristic, said transistor further exhibiting a given input impedance characteristic of a substantially capacitive nature between said base and said emitter electrodes, first reactance means connected between said first input terminal and said base electrode, second reactance means connected between said base and collector electrodes, said first and second reactance means having substantially the same values, means for connecting said emitter electrode to said second input terminal whereby said audio modulation signal voltages are applied between said emitter and said base electrodes, said modulation voltages varying said transconductance characteristic of said transistor to thereby vary the phase shift of the carrier wave signals, said transistor input impedance effectively limiting the amount of phase shift which can be provided, inductance means connected between said collector electrode and a reference potential for nullifying the capacitive effect of said transistor input impedance to increase said phase shift capability, and circuit means for connecting said collector electrode to said output terminal.

2. In a phase modulation system including an oscillator for generating a main oscillation of substantially constant amplitude and phase, a deviation control circuit for deriving audio modulation voltages of constant amplitude, and frequency multiplying means, a phase modulator including in combination, a transistor with base, emitter and collector electrodes and having a selected transconductance characteristic, said transistor further having an inherent input impedance characteristic of a substantially capacitive nature between said base and said emitter electrode, first reactance means with a given impedance connecting the oscillator to said base electrode, second reactance means with said same given impedance connected between said base and said collector electrodes, voltage supply means coupled to said transistor for supplying operating potentials thereto, first circuit means for applying the audio modulation voltages from the deviation control circuit between said base and said emitter electrodes, said audio modulation voltages varying said tranconductance of said transistor to vary the phase shift of the main oscillation signal accordingly, said transistor input impedance limiting the amount of phase shift which can be provided, second circuit means connecting said collector electrode to the frequency multiplying means and a variable inductance connected between said collector electrode and said voltage supply means, said inductance having a selected value to nullify the capacitive effect of said transistor input impedance and to match the output impedance of said phase modulator to said frequency multiplying means.

3. In a miniaturized radio transmitter apparatus having an oscillator for generating a source of carrier wave signals, a deviation control circuit for deriving a source of modulating signals, and a frequency multiplier circuit for multiplying the frequency of the carrier wave signal, a phase modulation circuit having an angular deviation characteristic which is twice the angle whose tangent is the absolute value of XG, and including in combination, a transistor with base, emitter and collector electrodes and having a transconductance characteristic of value G approximating said angular deviation characteristic, first reactance means of value X connected between the oscillator and said base electrode and second reactance means of value X connected between said base and said collector electrodes, means for supplying operating potential to said transistor including a temperature sensitive resistor for stabilization over a desired ambient temperature range, circuit means for applying the modulating signal voltages from the deviation control circuit between said base and said emitter electrodes to vary said transconductance characteristic of said transistor according to the instantaneous value of said modulating voltages, a variable inductance connected between said collector electrode and said potential supply means, and means for coupling said collector electrode to the frequency multiplier circuit.

4. In a phase modulation system including an oscillator for generating a main oscillation of substantially constant amplitude and phase, a deviation control circuit for deriving audio modulation voltages of constant amplitude, and a frequency multiplier circuit including a first transistor with an input electrode, a phase modulator circuit including in combination, a second transistor with base, emitter and collector electrodes and having a selected transconductance characteristic, said transistor further having an inherent input impedance of a substantially capacitive nature, first reactance means with a given impedance connecting the oscillator to said base electrode, second reactance means with said same given impedance connected between said base and said collector electrodes, voltage supply means coupled to said transistor for supplying operating potentials thereto, means for applying said audio modulation signal voltages betwen said base and said emitter electrodes, said audio modulation voltages varying said transistor input impedance to increase said phase shift of the main oscillation signal accordingly, said transistor input impedance limiting the maximum phase shift which can be effected, a variable inductance connected between said collector electrode and said voltage supply means, and circuit means for connecting said collector electrode of said second transistor to said input electrode of said frequency multiplier circuit, said inductance having a selected value for nullifying the capacitive effect of said transistor input impedance to increase said phase shift capability and to permit optimum impedance matching between said second transistor collector electrode and said first transistor input electrode, thereby insuring minimum distortion and maximum linear deviation.

5. A phase modulator circuit including in combination, a transistor having input, output and common electrodes, said transistor exhibiting an input impedance of a substantially capacitive nature between said input and common electrodes, voltage supply means coupled to said transistor for providing operating potentials thereto, means providing a high frequency carrier wave of substantially constant amplitude and phase, first and second capacitors having values of the same order of magnitude connected in series with each other and connecting said means providing a high frequency carrier wave to said output electrode of said transistor, means connecting the common junction between said capacitors to said input electrode of said transistor for applying said carrier wave thereto, means providing low frequency modulating signals coupled to said input and common electrodes for varying the conduction of said transistor between said common and output electrodes, whereby said first and second capacitors in combination with the circuit including said common and output electrodes of said transistor produces a shift in the phase of the carrier wave at said output electrode which is controlled by said modulating signals, said capacitive effect of said transistor input electrodes limiting the phase shift so produced, and a compensating coil connected between said output electrode and said voltage supply means, said compensating coil having a value selected to effectively reduce the effect of said capacitive impedance between said transistor input and common electrodes to increase the phase shift capability and to reduce distortion.

References Cited by the Examiner

UNITED STATES PATENTS

| | | | |
|---|---|---|---|
| 2,033,231 | 3/36 | Crosby | 332—30 X |
| 2,456,716 | 12/48 | Lewinter | 332—27 |
| 2,570,939 | 10/51 | Goodrich | 332—29 X |
| 2,852,746 | 9/58 | Scheele | 332—16 |

ROY LAKE, *Primary Examiner.*

JOHN KOMINSKI, *Examiner.*